United States Patent
Leijten (10) Patent No.: US 7,313,671 B2
(45) Date of Patent: Dec. 25, 2007

(54) PROCESSING APPARATUS, PROCESSING METHOD AND COMPILER

(75) Inventor: Jeroen Anton Johan Leijten, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 261 days.

(21) Appl. No.: 10/524,535

(22) PCT Filed: Jul. 18, 2003

(86) PCT No.: PCT/IB03/03284

§ 371 (c)(1),
(2), (4) Date: Feb. 10, 2005

(87) PCT Pub. No.: WO2004/017197

PCT Pub. Date: Feb. 26, 2004

(65) Prior Publication Data

US 2005/0257027 A1    Nov. 17, 2005

(30) Foreign Application Priority Data

Aug. 16, 2002  (EP)  ................... 02078393

(51) Int. Cl.
*G06F 9/38* (2006.01)
(52) U.S. Cl. ...................................... 712/24
(58) Field of Classification Search ................... 712/24
See application file for complete search history.

(56) References Cited

U.S. PATENT DOCUMENTS 6,023,756 A    2/2000  Okamura (Continued)

FOREIGN PATENT DOCUMENTS

EP    0 886 210    12/1998

(Continued)

*Primary Examiner*—William M. Treat
(74) *Attorney, Agent, or Firm*—Leydig, Voit & Mayer, Ltd.

(57) ABSTRACT

Computer architectures consist of a fixed data path, which is controlled by a set of control words. Each control word controls part of the data path. Each set of instructions generates a new set of control words. In case of a VLIW processor, multiple instructions are packaged into one so-called VLIW instruction. A VLIW processor uses multiple, independent functional units to execute these multiple instructions in parallel. Application specific domain tuning of a VLIW processor requires that instructions having varying requirements with respect to the number of instruction bits they require can be encoded in a single VLIW instruction, such that an efficient encoding and encoding of instructions is maintained. The present invention describes a processing apparatus as well as a processing method for processing data, allowing the use of such an asymmetric instruction set. The processing apparatus comprises at least a first ($UC_0$) and a second issue slot ($UC_3$), wherein each issue slot comprises a plurality of functional units ($FU_{01}$-$FU_{02}$, $FU_{30}$-$FU_{32}$). The first issue slot ($UC_0$) is being controlled by a first control word (411) being generated from a first instruction (InstrA) and the second issue slot is being controlled by a second control word (417) being generated from the second instruction (InstrD), the width of the first control word (411) being different from the width of the second control word (417). By varying the width of a corresponding control word, instructions requiring a different number of bits can be efficiently encoded in a VLIW instruction while allowing an efficient instruction decoding as well.

11 Claims, 4 Drawing Sheets

U.S. PATENT DOCUMENTS 6,101,592 A * 8/2000 Pechanek et al. .............. 712/20
6,173,389 B1 * 1/2001 Pechanek et al. .............. 712/24
6,360,312 B1 * 3/2002 Kawaguchi ................. 712/215

FOREIGN PATENT DOCUMENTS

WO     WO 98/27486     6/1998

* cited by examiner

PROCESSING APPARATUS, PROCESSING METHOD AND COMPILER

TECHNICAL FIELD

The invention relates to a processing apparatus, comprising:
 an input means for inputting data;
 a register file for storing said input data;
 at least a first and a second issue slot, wherein each issue slot comprises a plurality of functional units;
and wherein the processing apparatus is conceived for processing data retrieved from the register file based on control signals generated from a set of instructions being executed in parallel, the set of instructions comprising at least a first and a second instruction, the first issue slot being controlled by a first control word corresponding to the first instruction and the second issue slot being controlled by a second control word corresponding to the second instruction.

The invention further relates to a processing method for processing data, said method comprising the following steps:
 storing input data in a register file;
 processing data retrieved from the register file based on control signals generated from a set of instructions being executed in parallel, the set of instructions comprising at least a first and a second instruction, a first issue slot being controlled by a first control word corresponding to the first instruction and a second issue slot being controlled by a second control word corresponding to the second instruction,
and wherein the first and the second issue slot comprise a plurality of functional units.

The invention further relates to a compiler program product for generating a sequence of sets of instructions, a set of instructions being arranged for parallel execution, the set of instructions comprising at least a first and a second instruction.

The invention further relates to an information carrier comprising a sequence of sets of instructions, a set of instructions being arranged for parallel execution, the set of instructions comprising at least a first and a second instruction.

The invention still further relates to a computer program comprising computer program code means for instructing a computer system to perform the steps of said method.

BACKGROUND ART

Computer architectures consist of a fixed data path, which is controlled by a set of control words. Each control word controls parts of the data path and these parts may comprise register addresses and operation codes for arithmetic logic units (ALUs) or other functional units. Each set of instructions generates a new set of control words, usually by means of an instruction decoder which translates the binary format of the instruction into the corresponding control word, or by means of a micro store, i.e. a memory which contains the control words directly. Typically, a control word represents a RISC like operation, comprising an operation code, two operand register indices and a result register index. The operand register indices and the result register index refer to registers in a register file.

In case of a Very Large Instruction Word (VLIW) processor, multiple instructions are packaged into one long instruction, a so-called VLIW instruction. A VLIW processor uses multiple, independent functional units to execute these multiple instructions in parallel. The processor allows exploiting instruction-level parallelism in programs and thus executing more than one instruction at a time. In order for a software program to run on a VLIW processor, it must be translated into a set of VLIW instructions. The compiler attempts to minimize the time needed to execute the program by optimizing parallelism. The compiler combines instructions into a VLIW instruction under the constraint that the instructions assigned to a single VLIW instruction can be executed in parallel and under data dependency constraints. Encoding of instructions can be done in two different ways, for a data stationary VLIW processor or for a time stationary VLIW processor, respectively. In case of a data stationary VLIW processor all information related to a given pipeline of operations to be performed on a given data item is encoded in a single VLIW instruction. For time stationary VLIW processors, the information related to a pipeline of operations to be performed on a given data item is spread over multiple instructions in different VLIW instructions, thereby exposing said pipeline of the processor in the program.

In practical applications, the functional units will be active all together only rarely. Therefore, in some VLIW processors, fewer instructions are provided in each VLIW instruction than would be needed for all the functional units together. Each instruction is directed to a selected functional unit that has to be active, for example by using multiplexers. In this way it is possible to save on instruction memory size while hardly compromising performance. In this architecture, instructions are directed to different functional units in different clock cycles. The corresponding control words are issued to a respective issue slot of the VLIW issue register. Each issue slot is associated with a group of functional units. A particular control word is directed to a specific one among the functional units of the group that is associated with the particular issue slot.

The encoding of parallel instructions in a VLIW instruction leads to a severe increase of the code size. Large code size leads to an increase in program memory cost both in terms of required memory size and in terms of required memory bandwidth. In modern VLIW processors different measures are taken to reduce the code size. One important example is the compact representation of no operation (NOP) operations in a data stationary VLIW processor, for example the NOP operations can be encoded by single bits in a special header attached to the front of the VLIW instruction, resulting in a compressed VLIW instruction. Instruction bits may still be wasted in each instruction of a VLIW instruction, because some instructions can be encoded in a more compact way than others can. Differences in encoding efficiency of instructions arise, for instance, because some corresponding operations require more operands or produce more results than other operations, or when certain operations require very large immediate operands as opposed to others requiring no or small immediate operands. These differences especially arise when application domain specific tuning of a VLIW processor is desired to increase its efficiency.

Powerful custom operations can be obtained by allowing operations in the instruction set that can consume more than two operands and/or that can produce more than one result. In tuned, yet flexible processors these complex operations usually coexist with basic operations that normally consume just two operands and produce just one result. An efficient instruction encoding has to be found, such that a compact code size is obtained, without causing a large negative impact on performance, power and area because of possibly more complicated decoding hardware. EP 1.113.356 describes a VLIW processor with a fixed control word width and every instruction is encoded using the same number of bits. The processor comprises a plurality of execution units and a register file. Decoded instructions are provided to the execution units and data are provided to/from the register file.

It is a disadvantage of the prior art processor that instructions that have varying requirements with respect to the number of instructions bits they require cannot be efficiently encoded in a single VLIW instruction.

DISCLOSURE OF INVENTION

An object of the invention is to provide a processing apparatus which allows the use of an instruction set comprising powerful, custom operations as well as basic operations, while maintaining an efficient encoding and decoding of instructions.

This object is achieved with a processing apparatus of the kind set forth, characterized in that the width of the first control word is different from the width of the second control word. In the processing apparatus according to the invention, the width of the control word, i.e. the number of bits, is adapted to the complexity of the plurality of the functional units present in the corresponding issue slot. Those issue slots having relatively complex functional units, e.g. functional units requiring more than two operands and/or producing more than one result, are controlled by a relatively wide control words, while at the same time issue slots having relatively simple functional units are controlled by relatively small sized control words. In this way, on the one hand powerful custom operations are allowed as well as basic operations, while the total size of the VLIW instruction can have a relatively modest size. An efficient decoding is allowed by adapting the decoding process to the width of the control word, which increases the performance of the processing apparatus due to less complicated decoding hardware. Furthermore, a processing apparatus can be designed having both issue slots comprising relatively simple functional units as well as issue slots comprising more complicated functional units. Such architecture allows adapting the design of a processing apparatus to the specific needs of a given range of applications.

An embodiment of the processing apparatus according to the invention is characterized in that said processing apparatus is a VLIW processor and wherein said set of instructions is grouped in a VLIW instruction. A VLIW processor allows executing multiple instructions in parallel, increasing the overall speed of operation, while having relatively simple hardware.

An embodiment of the processing apparatus according to the invention is characterized in that the VLIW instruction is a compressed VLIW instruction, comprising dedicated bits for encoding of NOP operations. The use of dedicated bits for encoding of NOP operations strongly reduces the code size of VLIW instructions, reducing the required memory size and bandwidth.

An embodiment of the processing apparatus according to the invention further comprises a decompression means for decompressing the compressed VLIW instruction and the decompression means is conceived to derive information on the control word width using the dedicated bits. The dedicated bits can be used to indicate which control words associated with a VLIW instruction comprise a non-NOP operation, allowing the apparatus to efficiently decompress the VLIW instruction.

An embodiment of the processing apparatus according to the invention is characterized in that the width of the first and the second control word is an integer multiple of a predetermined value. As a result, the decompression logic can be made less complex and the decompression process can be made faster.

According to the invention a processing method is characterized in that the width of the first control word is different from the width of the second control word. The method allows efficient encoding of instructions that have widely varying requirements with respect to the number of instruction bits they require, while maintaining an efficient decoding process.

Preferred embodiments of the invention are defined in the dependent claims. A compiler program product for generating a sequence of sets of instructions suitable for execution by a processing apparatus according to the invention for processing data is defined in claim 12. It is noted that a compiler for a TriMedia processor is known, and this compiler generates a sequence of sets of instructions, wherein a set of instructions may comprise two instructions having a different width. However, the control words corresponding to these instructions have an equal width. A computer program for implementing the method according to the invention for processing data is defined in claim 13. An information carrier comprising a sequence of sets of instructions executed by a processing apparatus according to the invention for processing data is defined in claim 14.

DESCRIPTION OF PREFERRED EMBODIMENTS

Figure 1:
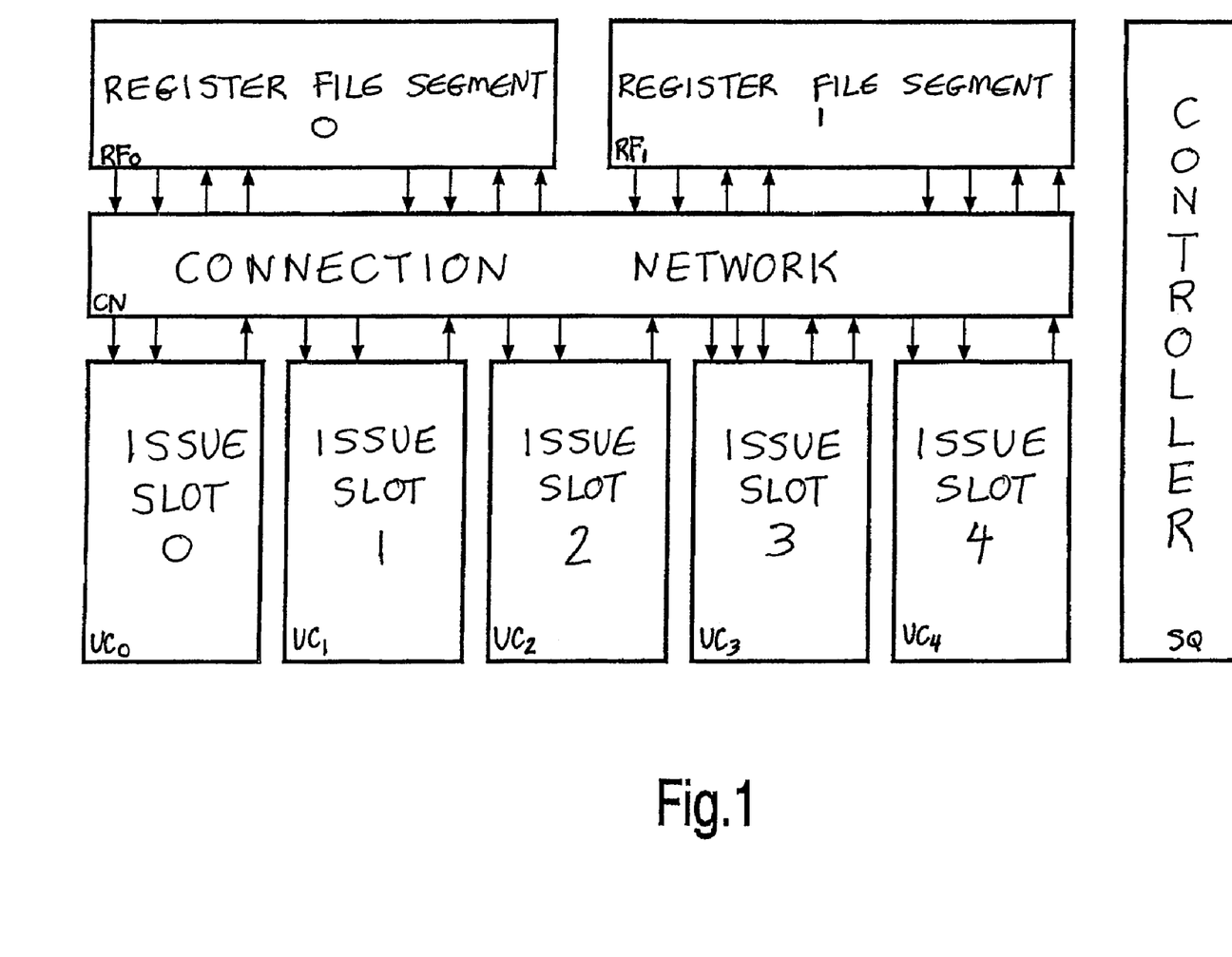
FIG. 1 is a schematic diagram of a VLIW processor according to the invention.

Referring to FIG. 1, a schematic block diagram illustrates a VLIW processor comprising a plurality of issue slots, including issue slot $UC_0$, $UC_1$, $UC_2$, $UC_3$ and $UC_4$, and a register file, including register file segments $RF_0$ and $RF_1$. The processor has a controller SQ and a connection network CN for coupling the register file segments $RF_0$ and $RF_1$, and the issue slots $UC_0$, $UC_1$, $UC_2$, $UC_3$ and $UC_4$. The register file segments $RF_0$ and $RF_1$ are coupled to a bus, not shown in FIG. 1, and via this bus the register file segments receive input data. Issue slots $UC_0$, $UC_1$, $UC_2$ and $UC_4$ represent issue slots with just a small number of relatively simple functional units, requiring only two operands and producing only one result. Issue slot $UC_3$ contains a larger number of more complex functional units, which may require more than two operands and/or may produce more than one result. It may also support a larger operation set and larger immediate values, or may have access to a larger register address space. As a consequence, more bits are required to encode an instruction for this issue slot, requiring a larger corresponding control word. Connection network CN allows passing of input data and result data between the register file segments $RF_0$ and $RF_1$, and the issue slots $UC_0$, $UC_1$, $UC_2$, $UC_3$ and $UC_4$.

In some embodiments, the register file segments $RF_0$ and $RF_1$ are distributed register files, i.e. several register files, each for a limited set of issue slots, are used instead of one central register file for all issue slots $UC_0$-$UC_4$. An advantage of a distributed register file is that it requires less read and write ports per register file segment, resulting in a smaller register file area, decrease in power consumption and increase in speed of operation. Furthermore, it improves the scalability of the processor when compared to a central register file.

In some embodiments, the connection network CN is a partially connected network, i.e. not each issue slot $UC_0$-$UC_4$ is coupled to each register file $RF_0$ and $RF_1$. The use of a partially connected communication network reduces the code size as well as the power consumption, and also allows increasing the performance of the processor. Furthermore, it improves the scalability of the processor when compared to a fully connected communication network.

Figure 2:
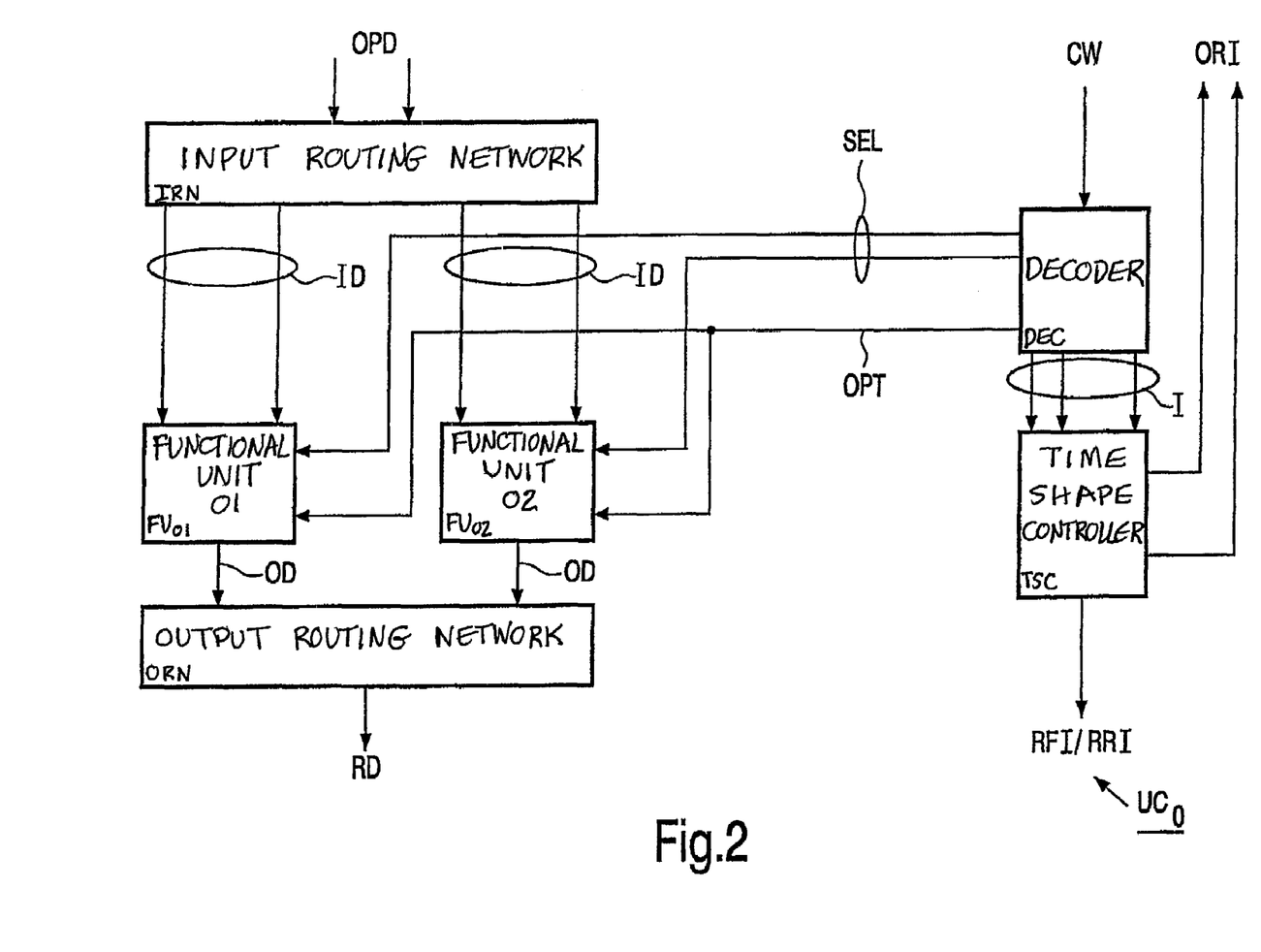
FIG. 2 is a schematic diagram of issue slot $UC_0$, comprising a set of relatively simple functional units.
Figure 3:
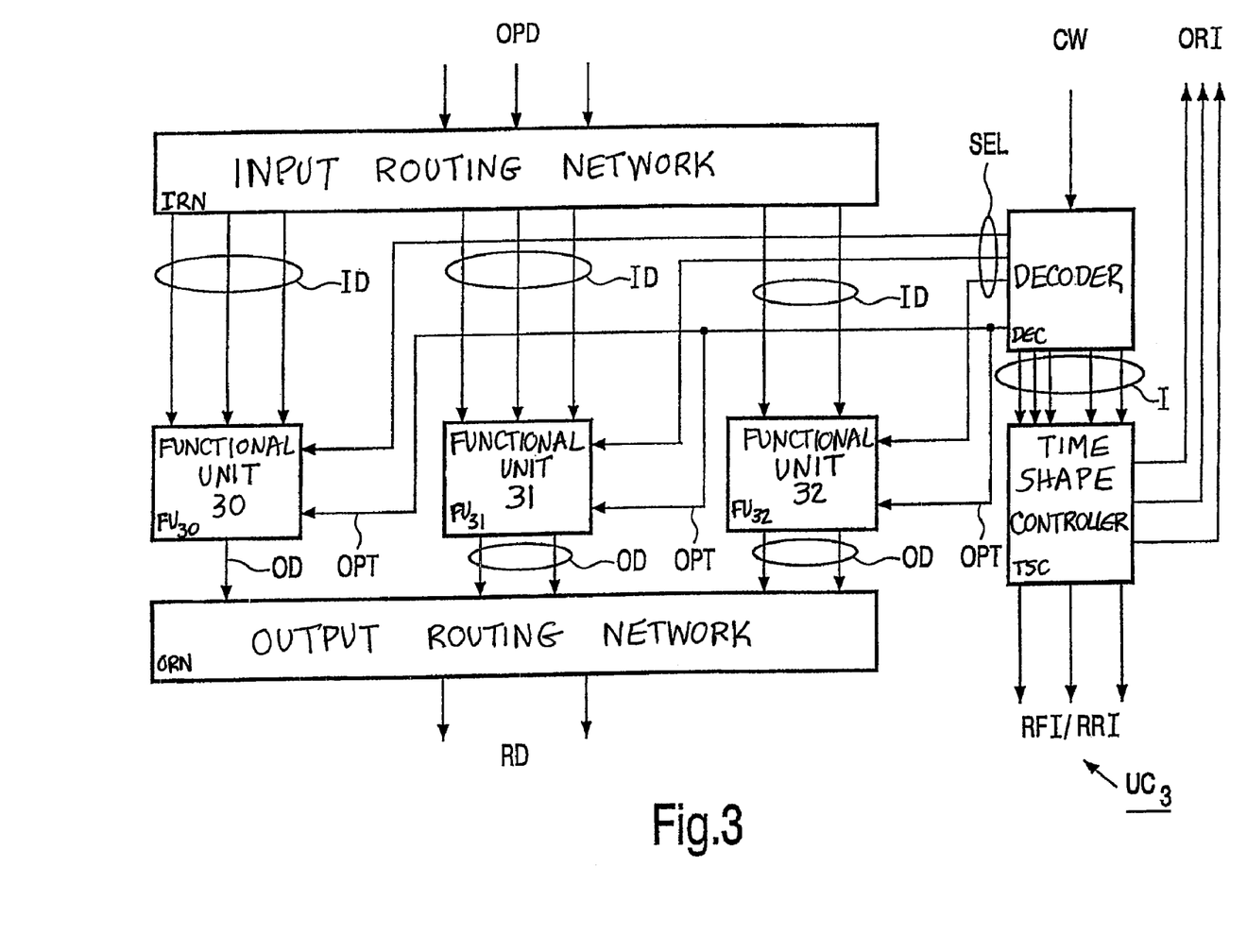
FIG. 3 is a schematic diagram of issue slot $UC_3$, comprising a set of more complex functional units.

Referring to FIG. 2, a schematic block diagram illustrates an embodiment of issue slot $UC_0$. Referring to FIG. 3, a schematic block diagram shows an embodiment of issue slot $UC_3$. Referring now to both FIG. 2 and FIG. 3, each issue slot comprises a decoder DEC, a time shape controller TSC, and input routing network IRN, an output routing network ORN, and a plurality of functional units $FU_{01}$ and $FU_{02}$ for issue slot $UC_0$ and $FU_{30}$, $FU_{31}$ and $FU_{32}$ for issue slot $UC_3$, respectively. The decoder DEC decodes the control word CW applied to the issue slot in each clock cycle. Results of the decoding step are operand register indices ORI, which refer to the registers in the register file segments $RF_0$ and $RF_1$ where the operand data for the operation to be executed are stored. Further results of the decoding step are result file indices RFI and result register indices RRI, which refer to the registers in the register file segments $RF_0$ and $RF_1$ where the result data have to be stored. The decoder DEC passes the indices ORI, RFI and RRI to the time shape controller TSC, via couplings I. The time shape controller TSC delays the indices ORI, RFI and RRI by the proper amount, according to the input/output behavior of the functional unit on which the operation is executed, and passes the indices to the connection network CN, shown in FIG. 1. If the VLIW instruction comprises instructions for the issue slots $UC_0$ and $UC_3$, the decoder DEC also selects one of the functional units $FU_{01}$ or $FU_{02}$ for issue slot $UC_0$ and one of the functional units $FU_{30}$, $FU_{31}$ or $FU_{32}$ for issue slot $UC_3$, via a coupling SEL, to perform an operation. Furthermore, the decoder DEC passes information on the type of operation that has to be performed by that functional unit, using a coupling OPT. The input routing network IRN passes the operand data OPD to functional units $FU_{01}$ and $FU_{02}$ of issue slot $UC_0$ and to functional units $FU_{30}$, $FU_{31}$ and $FU_{32}$ of issue slot $UC_3$, via couplings ID. The functional units $FU_{01}$, $FU_{02}$ of issue slot $UC_0$ and $FU_{30}$, $FU_3$, and $FU_{32}$ of issue slot $UC_3$ pass their result data to the output routing network ORN via couplings OD, and subsequently the output routing network ORN passes the result data RD to the communication network CN, shown in FIG. 1.

Referring to FIG. 2, the functional units $FU_{01}$ and $FU_{02}$ require two operands and produce one result data, as can be seen from their corresponding number of couplings ID and OD, respectively. The functional units $FU_{01}$ and $FU_{02}$ do not require any large immediate values as operand data. Therefore, the instruction associated with issue slot $UC_0$ as well as the corresponding control word can be kept relatively small, as they comprise only one operand code, two operand register indices ORI, and one result file index RFI or result register index RRI.

Referring to FIG. 3, the functional units $FU_{30}$, $FU_{31}$ and $FU_{32}$ are more complex functional units. Functional units $FU_{30}$ and $FU_{31}$ require three operand data, and functional units $FU_{31}$ and $FU_{32}$ produce two output data. Furthermore, the functional units may use a large immediate value as an operand. The width of the instruction associated with issue slot $UC_3$ has to be larger than the width of the instruction associated with issue slot $UC_0$, as the first may comprise an operand code, three operand register indices and two result register indices. Therefore, the width of the corresponding control word issued to issue slot $UC_3$ has to be larger than the width of the control word issued to issue slot $UC_0$.

Figure 4:
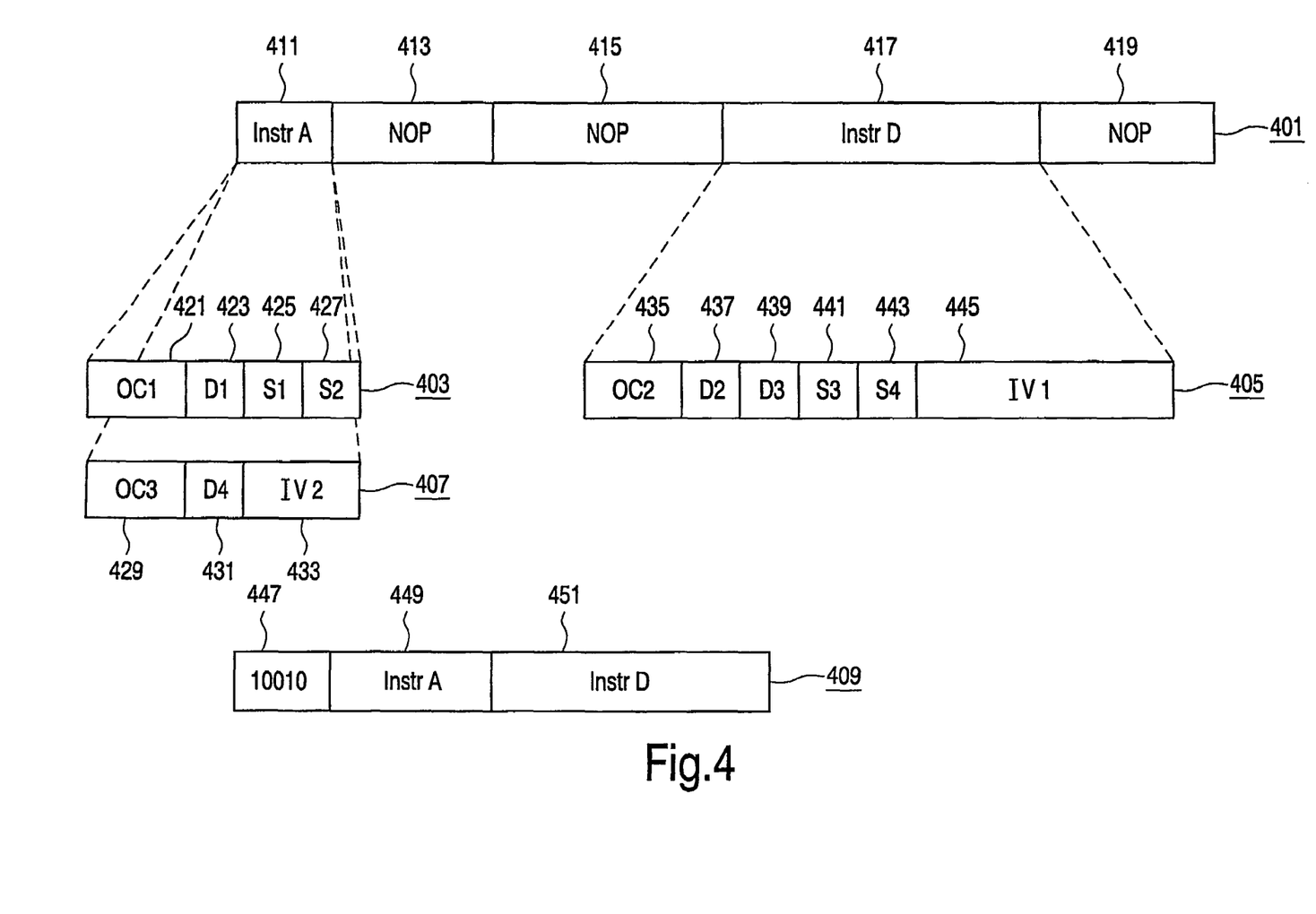
FIG. 4 shows a compressed VLIW instruction and a corresponding uncompressed VLIW instruction.

Referring to FIG. 4, examples of VLIW instructions are shown for the VLIW processor shown in FIG. 1. The uncompressed VLIW instruction 401 comprises five control words 411-419 and onto each control word an instruction is mapped for a corresponding issue slot $UC_0$, $UC_1$, $UC_2$, $UC_3$ and $UC_4$, respectively. The control words 413, 415 and 419 comprise a NOP operation, associated with issue slots $UC_1$, $UC_2$ and $UC_4$, respectively. Control word 411 comprises an instruction InstrA and control word 417 comprises an instruction InstrD, corresponding to issue slot $UC_0$ and $UC_3$, respectively. The width of the control words 411-419 differs, enabling the encoding of simpler instructions or a smaller set of instructions associated with a relatively simple issue slot, and encoding of more complex instructions or a larger set of instructions associated with more complex issue slots. For example, instruction InstrA has a relatively small width, since it corresponds to issue slot $UC_0$, while instruction InstrD has a larger width as it is associated with issue slot $UC_3$.

Different instruction formats may be used for different instructions mapped onto in the same control word 411-419. The instruction format may be varied, depending on the type of instruction that has to be executed, or on the use of an immediate value as an operand as opposed to retrieving one from the register file, for example. Two possible instruction formats for instruction InstrA are shown by instruction 403 and instruction 407 respectively. Instruction 403 comprises four fields 421-427, having an operation code OC1, a result register index D1 and two operand register indices S1 and S2, respectively. Alternatively, instruction 407 comprises three fields 429-433, having an operation code OC3, a result register index D4 and a large immediate operand value IV2, respectively. A possible instruction format for instruction InstrD is shown by instruction 405, having six fields 435-445, associated with an operation code OC2, two result register indices D2 and D3, two operand register indices S3 and S4 and an immediate operand value IV1, respectively. Different formats for different instructions encoded in the control word 417 are possible as well, not shown in FIG. 4. For example, in instruction 405 more bits could be spent on encoding more operations or large immediate values, and less on operand register indices.

The VLIW processor shown in FIG. 1 is capable of executing custom operations for a specific application domain as well as RISC like operations. The difference in complexity of issue slots $UC_0$, $UC_1$, $UC_2$, $UC_3$ and $UC_4$ is reflected by the difference in instruction width between the instructions mapped onto control words 411-419 of VLIW instruction 401. The width of the control words associated with the instructions, and issued to issue slots $UC_0$-$UC_4$, respectively, is adapted to the width of the instruction for a specific issue slot. Furthermore, the width of the control words is fixed during design of the VLIW processor. For example, the width of instruction InstrA is smaller compared to the width of instruction InstrD, resulting in a smaller width of the control word 411 issued to issue slot $UC_0$ compared to the width of the control word 417 issued to issue slot $UC_3$.

The uncompressed VLIW instruction 401 can be compressed by encoding the NOP operations using a set of dedicated bits. An example of a compressed instruction, after compressing VLIW instruction 401 is shown by VLIW instruction 409, which comprises a field 447 having a set of dedicated bits, and control words 449 and 451 having instructions InstrA and InstrD, respectively. Single bits in the set of dedicated bits encode the NOP operations mapped onto the control words 413, 415 and 417 of VLIW instruction 401. A bit '0' refers to a NOP operation and the position of the bit in the field 447 points to the control word within VLIW instruction 401 that holds this NOP operation. The '0' bits at positions two, three and five within field 447 refer to the NOP operations present in VLIW instruction 401 in control words 413, 415 and 419, respectively. A bit '1' present in field 447 refers to an instruction having a non-NOP operation, and the position of the bit in the field 447 points to the control word within VLIW instruction 401 onto which this instruction is mapped. The '1' bit at positions one and four within field 447 refer to the instructions InstrA and InstrD in control words 411 and 417, respectively. In other embodiments, different ways of compressing VLIW instructions may be applied, as known by the person skilled in the art.

In an advantageous embodiment, the VLIW instruction is a compressed VLIW instruction. The compressed VLIW instruction is decompressed by decompression logic present in controller SQ. The width of each control word is laid down in the hardware of the decompression logic. The decoding of compressed VLIW instructions by sequencer SQ is performed as follows. Compressed VLIW instructions are decompressed by adding control words comprising NOP operations to the VLIW instruction 409, using the '0' bits and their position in field 447, as well as the information present in the decompression logic on the width of each control word issued to issue slots $UC_0$-$UC_4$, respectively. The decoding of the control words takes place inside the corresponding issue slot $UC_0$-$UC_4$, by the decoder DEC present in that issue slot. For each issue slot, the different instruction formats as well as the width of the corresponding control word, are laid down in the hardware of the decoder DEC associated with that issue slot. As the width of the control word associated with different issue slots may differ, the design of the corresponding decoder DEC may differ as well in order to optimize its performance. An efficient instruction encoding is obtained, since no additional bits in the VLIW instruction 409 are required to indicate the width of the control words. As a result, a compact code size is obtained. Furthermore, the VLIW processor has a fast way of determining at runtime which and how many bits of a compressed VLIW instruction 409 belong to each instruction mapped on the control words 449-451, because the dedicated bits in field 447 indicate which control words in a VLIW instruction 401 comprise instructions having non-NOP operations and because the width of each control word is known by the decompression logic. The decoding performed inside the issue slots $UC_0$-$UC_4$ can be done efficiently as well, as the width of the corresponding control word and the corresponding different instruction formats are known by the decoder DEC associated with a specific issue slot. As a result, a fast and efficient decoding of instructions is allowed.

Preferably, the width of all control words corresponding to issue slots $UC_1$-$UC_4$ are an integer multiple of a predetermined value, for example having one byte as predetermined value. As a result, the complexity of the decompression logic is reduced, since shifting of bits can now take place in steps of a slice equal to that predetermined value, thereby limiting the maximum number of bits it has to shift in one step. A further advantage of using a predetermined value equal to one byte is related to VLIW instructions being ideally stored in byte-aligned fashion in a program memory. Choosing a predetermined value equal to one byte, as well as choosing the width of the field 447 comprising the set of dedicated bits in compressed VLIW instruction 409 equal to an integer multiple of one byte, automatically results in byte-alignment of the compressed VLIW instructions.

A superscalar processor also comprises multiple issue slots that can perform multiple operations in parallel, as in case of a VLIW processor. However, the processor hardware itself determines at runtime which operation dependencies exist and decides which operations to execute in parallel based on these dependencies, while ensuring that no resource conflicts will occur. The principles of the embodiments for a VLIW processor, described in this section, also apply for a superscalar processor. In general, a VLIW processor may have more issue slots in comparison to a superscalar processor. The hardware of a VLIW processor is less complicated in comparison to a superscalar processor, which results in a better scalable architecture. The number of issue slots and the complexity of each issue slot, among other things, will determine the amount of benefit that can be reached using the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. A processing apparatus, comprising:
an input means for inputting data;
a register file for storing said input data;
at least a first and a second issue slot, wherein each issue slot comprises a plurality of functional units;
and wherein the processing apparatus is conceived for processing data retrieved from the register file based on control signals generated from a set of instructions being executed in parallel, the set of instructions comprising at least a first and a second instruction, the first issue slot being controlled by a first control word corresponding to the first instruction and the second issue slot being controlled by a second control word corresponding to the second instruction,
characterized in that the width of the first control word is different from the width of the second control word.

2. An apparatus according to claim 1, wherein said processing apparatus is a VLIW processor and wherein said set of instructions is grouped in a VLIW instruction.

3. An apparatus according to claim 2, wherein the VLIW instruction is a compressed VLIW instruction, comprising dedicated bits for encoding of NOP operations.

4. An apparatus according to claim 3, comprising a decompression means for decompressing the compressed VLIW instruction and wherein the decompression means is conceived to derive information on the control word width using the dedicated bits.

5. An apparatus according to claim 1, which further comprises a connection network for coupling the register file and the issue slots.

6. An apparatus according to claim 2, wherein the register file is a distributed register file.

7. An apparatus according to claim 1, wherein the width of the first and the second control word is an integer multiple of a predetermined value.

8. A processing method for processing data, said method comprising the following steps:
   storing input data in a register file;
   processing data retrieved from the register file based on control signals generated from a set of instructions being executed in parallel, the set of instructions comprising at least a first and a second instruction, a first issue slot being controlled by a first control word corresponding to the first instruction and a second issue slot being controlled by a second control word corresponding to the second instruction, and wherein the first and the second issue slot comprise a plurality of functional units, characterized in that the width of the first control word is different from the width of the second control word.

9. A method according to claim 8, wherein said set of instructions is grouped in a VLIW instruction.

10. A method according to claim 9, wherein the VLIW instruction is a compressed VLIW instruction, comprising dedicated bits for encoding of NOP operations.

11. A method according to claim 10, further comprising the step of decompressing the compressed VLIW instruction by means of a decompression means, and wherein the decompression means derives information on the control word width using the dedicated bits.

* * * * *